United States Patent

Keehn et al.

[11] Patent Number: 5,906,838
[45] Date of Patent: May 25, 1999

[54] SYMMETRICAL FLOW EXTRUSION MANIFOLD

[75] Inventors: William T. Keehn, Genoa; Theodore J. Molski, Chicago Heights; Edwin L. Morphey, St. Anne, all of Ill.

[73] Assignee: The Quaker Oats Company, Chicago, Ill.

[21] Appl. No.: 08/166,390

[22] Filed: Dec. 13, 1993

[51] Int. Cl.⁶ .................................................. B29C 47/06
[52] U.S. Cl. ................................. 425/131.1; 425/133.1; 425/308; 425/311; 425/463
[58] Field of Search ............................. 425/131.1, 133.1, 425/461, 462, 463, 376.1, 379.1, 311, 313, 314, 308, 310; 264/142, 171, 172.15, 173.16; 406/503, 516, 518

[56] References Cited

U.S. PATENT DOCUMENTS

| | | | |
|---|---|---|---|
| 1,293,535 | 2/1919 | Perry | 264/171 |
| 2,125,729 | 8/1938 | Kretchmer | 425/133.1 |
| 2,252,900 | 8/1941 | Shafer | 425/311 |
| 2,286,405 | 6/1942 | Gordon | 264/142 |
| 2,775,788 | 1/1957 | Andrew | 425/313 |
| 3,480,445 | 11/1969 | Slaybaugh | 425/133.1 |
| 3,541,198 | 11/1970 | Ueda et al. | 264/172.15 |
| 3,748,074 | 7/1973 | Nitta et al. | 425/381.2 |
| 3,807,919 | 4/1974 | Kaufman, Jr. et al. | 425/288 |
| 4,134,952 | 1/1979 | Yoshikawa et al. | 425/133.1 |
| 4,152,104 | 5/1979 | Przytulla et al. | 425/133.1 |
| 4,167,383 | 9/1979 | Murakami et al. | 425/462 |
| 4,185,954 | 1/1980 | Murakami et al. | 425/462 |
| 4,208,175 | 6/1980 | Rosenbaum | 425/131.1 |
| 4,402,898 | 9/1983 | Rosenbaum | 264/173 |
| 4,647,467 | 3/1987 | Pinto | 426/502 |
| 4,648,821 | 3/1987 | Thulin | 425/133.1 |
| 4,882,185 | 11/1989 | Simelunas et al. | 426/283 |
| 4,888,192 | 12/1989 | Ramnarine | 426/448 |
| 4,900,572 | 2/1990 | Repholz et al. | 426/282 |
| 4,954,061 | 9/1990 | Repholz et al. | 425/463 |
| 5,110,276 | 5/1992 | Farnsworth et al. | 425/133.1 |
| 5,120,554 | 6/1992 | Farnsworth et al. | 426/282 |
| 5,124,161 | 6/1992 | van Lengerich et al. | 426/94 |
| 5,198,239 | 3/1993 | Beavers | 425/133.1 |
| 5,297,946 | 3/1994 | Yoshida et al. | 425/133.1 |

FOREIGN PATENT DOCUMENTS

| | | |
|---|---|---|
| 0 434 983 A1 | 3/1991 | European Pat. Off. . |
| 2 591 071 | 6/1987 | France . |
| 1384979 | 2/1975 | United Kingdom ............... 425/133.1 |

*Primary Examiner*—Mathieu D. Vargot
*Attorney, Agent, or Firm*—Wallenstein & Wagner, Ltd.

[57] ABSTRACT

A multiple-orifice co-extrusion manifold is disclosed for use in high-volume, cost-efficient extrusion of multi-layered products, such as center-filled food products. A flow path is provided for each substance to be extruded. For each extrudable substance, the flow path between its extruder and each of a plurality of extrusion orifices is sufficiently equal to the other flow paths for that substance, that a substantially uniform distribution and volumetric flow is obtained at each orifice without the need for individual adjustment apparatus. Within the manifold, the flow paths preferably comprise a generally symmetrical chamber for flowing a first extrudate and a plurality of tubes, for flowing a second substance. The tubes extend through the chamber in a generally symmetrical relationship to each other and to the chamber. Each flow path is thus generally equal and symmetrical to the other flow paths. The two substances are co-extruded as continuous, radially-layered products and are subsequently divided into pre-determined lengths by a series of blades mounted on an extrudate inlet pipe and rotating about the manifold.

38 Claims, 3 Drawing Sheets

SYMMETRICAL FLOW EXTRUSION MANIFOLD

TECHNICAL FIELD

The present invention relates generally to a method and apparatus for extruding generally cylindrical, multi-layered materials and more particularly to a manifold with multiple-extrusion orifices for coextrusion, such as may be used in the manufacture of center-filled food products and methods of using same.

BACKGROUND OF INVENTION

There are numerous desirable products made by extruding two or more substances together so that the substances become generally radially-layered. The process for making such products is generally referred to as coextrusion. In other words, a product is formed by extruding a first substance which circumferentially surrounds a second substance and, where desired, the second surrounds a third, and so on. Others have proposed methods and apparatus for making such products. For example, U.S. Pat. Nos. 4,402,898 and 4,208,175 disclose methods and apparatus for extruding radially-layered plastic tubing. U.S. Pat. Nos. 5,124,161; 5,120,554; 5,110,276; 4,900,572; 4,882,185; and, 4,648,821 disclose methods and apparatus for extruding center-filled food products.

Generally coextrusion involves a separate extruder for each substance to be combined into the multi-layered extrusion product. Each of these extruders flows the extrudable substance or "extrudate" into an apparatus such as a manifold. This apparatus presents flow paths to the various substances to direct them ultimately to a means which combines them and extrudes them as a multi-layered (usually radially-layered) product through an extrusion orifice. While not disclosed by some, others in the art cited above recognize a need for the apparatus or manifold to have multiple-extrusion orifices for higher production output.

However, problems arise in connection with producing radially-layered products, especially when multiple orifices are employed. For example, it can be difficult to achieve a product which is uniform from orifice to orifice. A primary reason for this is that the extrudable substance flowing from any given extruder must be divided in some manner to distribute the substance along a flow path to each extrusion orifice. With conventional apparatus, achieving uniform distribution to each orifice, requires separate adjustment to vary the flow path or flow rate leading to each given orifice. Such adjustments must be checked, and perhaps repeated whenever a new batch of extrudate is supplied from the extruder. Adjustments may also be required upon conditions changing, such as temperature or flow rate from the extruder. These adjustments are not desirable as they require the purchase, installation and maintenance of the flow varying apparatus. Also, valuable production time is consumed in making the adjustments and scrap may be generated until the adjustments are complete. For example, U.S. Pat. Nos. 5,120,554 and 5,110,276 teach the use of valves interposed in the flow path of the extrudates to vary and adjust volumetric flow.

Uniform distribution of extrudate is also impeded by the inherent necessity of introducing the flow path of inner extrudable substances within the flow path of the outer extrudable substances. To address this problem, others have proposed complex manifold structures employing spider plates and the like which attempt to uniformly divide outer substance by flowing into additional flow paths temporarily while the flow path of the inner substance can be interposed and brought into coaxial alignment, with the outer substance flow path. In these embodiments, the outer substance is generally then recombined before it proceeds to the extrusion orifice. The apparatus proposed for this dividing and recombining flow is complex and further impedes uniform distribution. The complexity also increases equipment capital and maintenance costs. Examples of these structures are disclosed in the above-cited patents.

While presenting an improvement over the above discussed approaches and while enjoying significant commercial success, U.S. Pat. No. 4,900,572 to Repholz nonetheless discloses, among other things, the need for adjustment of flow and distribution of extrusion. For example, in Repholz, the extrudate flow and uniformity are adjusted by separately turning individual eccentric sleeves in each of the extrusion orifices.

Generally uniform distribution of extrudable substance is also frustrated by non-symmetrical and non-equal flow paths presented by conventional apparatus from the extruders to each of the multiple extrusion orifices.

SUMMARY OF THE INVENTION

The present invention provides a method and apparatus for high volume, cost efficient extrusion of a generally radially-layered product. According to one aspect of the invention, a plurality of extruders are provided and a flow path between an extruder and each of a plurality of multiple-extrusion orifices is sufficiently equal to obviate the need for individual adjustment apparatus, such as valves or eccentric sleeves in the orifices, to obtain a substantially uniform distribution and volumetric flow at each extrusion orifice. The use of symmetry in a multiple-orifice extrusion manifold is contemplated as another aspect of the invention. Thus, a plurality of radially-layered substances are produced by providing an extrudable substance for each layer of product, extruding each extrudable substance to a plurality of extrusion orifices through an equal and symmetrical flow path.

More specifically, one aspect of the invention contemplates a multiple-orifice extrusion manifold including a housing with a symmetrical chamber and a plurality of orifices in the housing adapted to extrude a first substance from the symmetrical chamber. The orifices are generally symmetrically spaced from each other. A plurality of tubes, adapted to carry a second substance, extend through the chamber in a generally symmetrical relationship to each other and the symmetrical chamber. Each tube has a terminal end cooperatively aligned with an extrusion orifice to extrude a second substance within the first substance. Thus, each extrudate substance is flowed to an extrusion orifice through a flow path, which is symmetrical with all other flow paths for that substance.

According to another aspect of the invention, a multiple-orifice extrusion manifold is employed, which includes a first housing defining an outer chamber and one or more extrusion walls. A plurality of orifices, adapted for extruding a first substance from the outer chamber, extend through the extrusion or walls. An inlet is provided in the first housing for flowing the first substance into the outer chamber. The inlet is located so as to permit flow of the first substance symmetrically within the outer chamber. A second housing which defines an inner chamber is provided within the first housing. The second housing is located symmetrically within the outer chamber. A plurality of tubes extend from the second housing. Each tube has a first end opening into the inner chamber and a second open end cooperatively aligned with an orifice for extruding a second substance from the inner chamber through the tube and to within the first substance.

According to another aspect of the invention, a multiple-orifice extrusion manifold includes a plurality of extrusion orifices and a means for flowing an outer layer substance from a first extruder output symmetrically to the extrusion orifices. The means for flowing an outer layer substance provides a fixed and equal flow path from the first extruder output to each of the extrusion orifices. A means for flowing an inner layer substance from a second extruder output to the extrusion orifices is provided. The means for flowing an inner layer substance also provides a fixed and equal flow path from the extruder output to each of the extrusion orifices.

According to another aspect of the invention, a multiple-orifice, multiple-layer extrusion apparatus, which includes a plurality of means for combining a plurality of extrudable substances and for extruding them as a continuous, radially-layered, generally cylindrical body. A plurality of extruders provide the plurality of extrudable substances. A plurality of flow paths are provided for each extrudable substance. The flow paths extend between the extruders and the means for combining a plurality of extrudable substances. Each of the flow paths for an extrudable substance is sufficiently symmetrical to the others, such that a flow of the extrudable substance is substantially equal at each orifice.

Another aspect of the invention provides a multiple-extrusion manifold having a first housing which defines an outer chamber and includes one or more extrusion walls. A plurality of orifices extend through the extrusion wall or walls and are adapted for extruding a first substance from the outer chamber. A second housing within the first housing defines an inner chamber having an axis. A plurality of tubes on the second housing each have a first end opening into the inner chamber and a second end cooperatively aligned with an orifice for extruding a second substance from the inner chamber. Each of the tubes extends away from the inner chamber at an angle to the axis thereof.

Another aspect of the present invention provides that a multiple-orifice extrusion manifold has a housing which presents a right circular cylindrical outer surface with a plurality of extrusion orifices therein. Optionally, the orifices are equally spaced around the outer surface. The manifold may also include one or more blades with a cylindrically rotating path about the cylindrical outer surface to cut the continuous extrusion at each orifice as the blade or blades pass the orifice. The blades may uniquely be mounted for rotation around an inlet pipe which supplies an extrudable substance to the housing.

Other advantages and aspects of the present invention will become apparent upon reading the following description of the drawings and detailed description of the invention.

DETAILED DESCRIPTION

Figure 1:
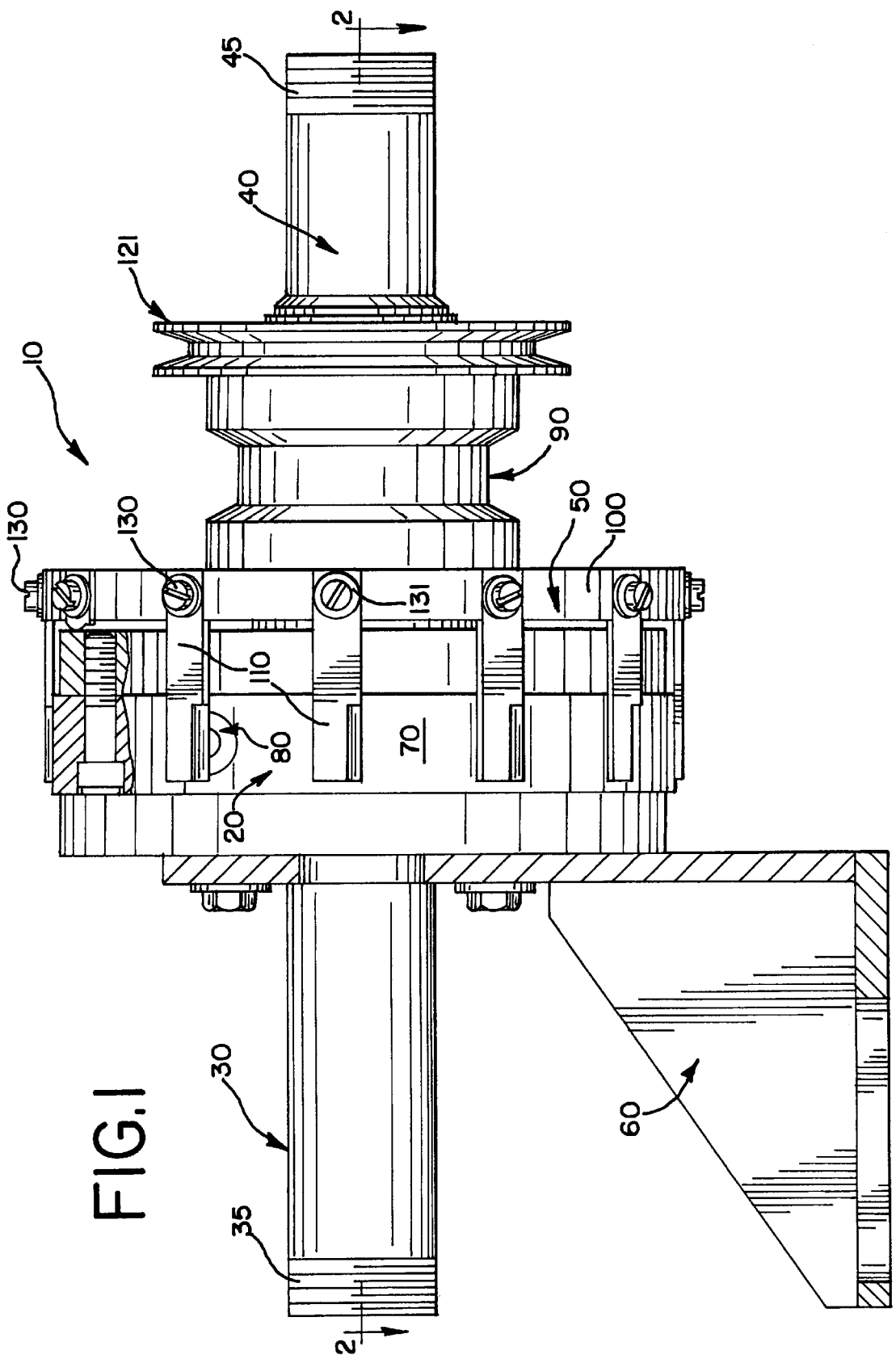
FIG. 1 is a side view of a multiple-orifice extrusion manifold in accordance with the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to the drawings, FIG. 1 discloses a multiple-orifice coextrusion manifold 10. The manifold 10 is used to coextrude center-filled pet food products such as those described in U.S. Pat. No. 4,900,572, the disclosure of which is incorporated herein by reference. While details of the extrudate ingredients can be found by reference to the above-cited patent, it should, at least, be understood that the extrudable substances of the present embodiment are dissimilarly textured extrudable doughs.

The manifold 10 includes a housing 20, inlet pipe 30, inlet pipe 40, and a cutting assembly 50, all of which are aligned along a common longitudinal axis. The manifold is secured by a mounting bracket 60. In practice, inlet pipe 40 will be attached to an output of a first extruder (not shown) containing a first extrudable dough which will comprise the outer layer of the pet food. Inlet pipe 30 will be attached to an output of a second extruder (not shown) containing a second extrudable dough which will comprise the inner layer or center of the center-filled pet food. Both inlet pipes 30 and 40 are attached to extruder feed pipes (not shown) by pipe threads 35 and 45 respectively. As will be understood by those in the art, the manifold 10 is of a free-standing type also referred to as a pipe-head manifold. It should be appreciated, however, that the principles of the present invention may also be employed with an extrusion apparatus which is integral with an extruder.

Housing 20 of manifold 10 is generally cylindrical and presents a cylindrical outer extrusion surface 70. Housing 20 has three extrusion orifices 80, (one of which is shown in FIG. 1) from which emanates three continuous bodies of coextruded pet food. The cutting assembly 50 cuts the continuous bodies into desired product lengths.

Figure 2:
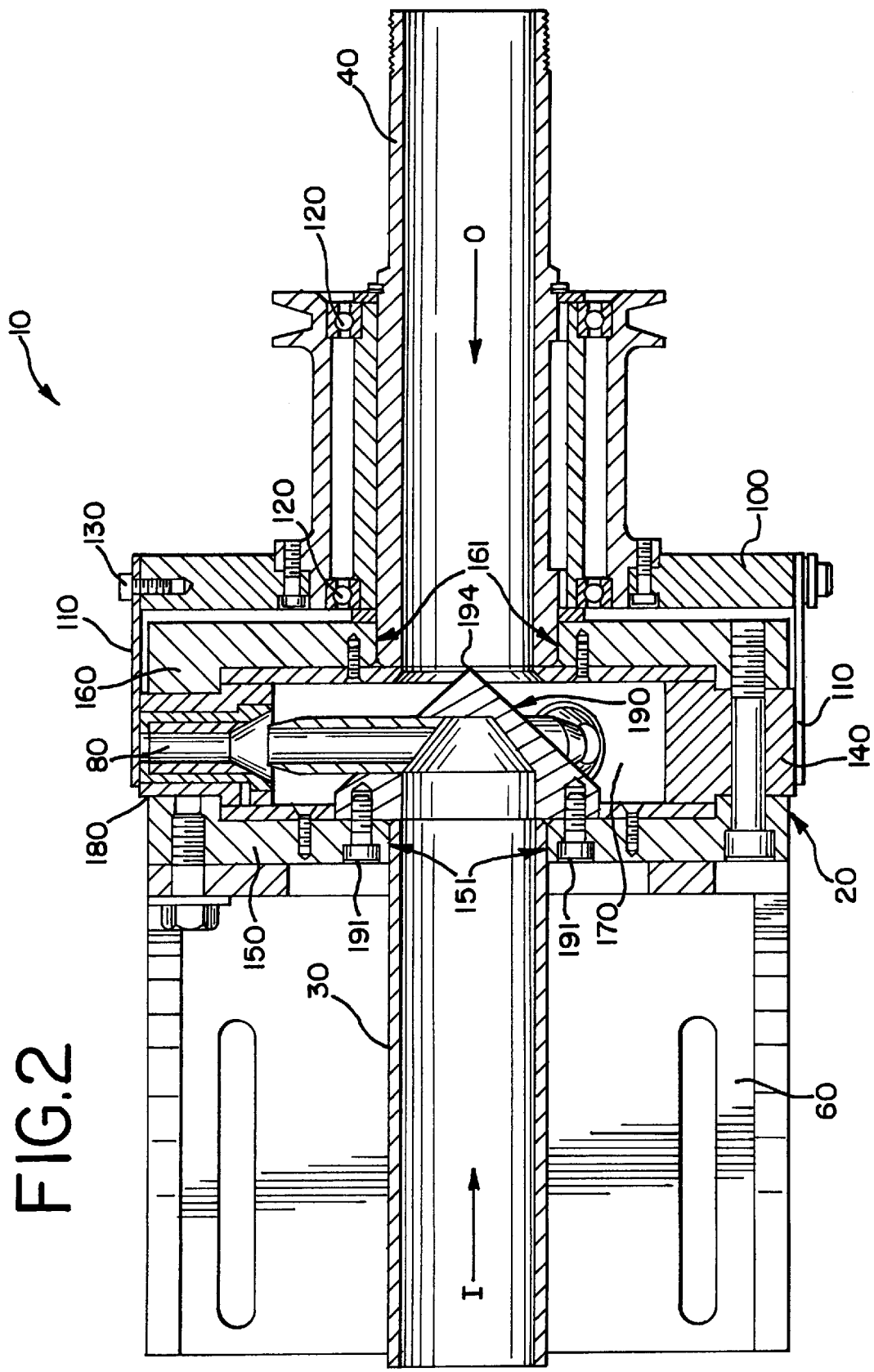
FIG. 2 is a cross sectional view of the manifold of FIG. 1 taken along line 2—2 of FIG. 1.

The cutting assembly includes a hub 90, a flange 100 and blades 110. As best seen in FIG. 2, the hub 90 is rotatably mounted on the inlet pipe 40 so as to rotate about the inlet pipe 40 on bearings 120. Flange 100 is a circular plate attached to the hub with a diameter approximating that of a diameter of the extrusion surface 70 of housing 20. Blades 110 are attached to a periphery of flange 100 at right angles thereto so as to extend over extrusion surface 70 sufficient to pass over extrusion orifices 80. The cutting assembly 50 is rotated by an external motor driving a "V-belt" which engages in pulley slot 121. Blades 110 are detachably mounted by slot head screws 130 so that they can be easily removed for cleaning and sharpening. A distance of the blades 110 from orifices 80, in other words, a blade clearance can be adjusted by placing washers 131 under the head of screws 130.

The length of the finished product can be adjusted by the speed of rotation of the cutting assembly 50, the number of blades 110 employed or the extrusion rate of the continuous body at the orifices. For example, the product will be longer if fewer blades 110 are used, or if the cutting assembly 50 rotates slower, or if the flow rate at the extrusion orifices 80 is faster. In practice, a sanitary shroud (not shown) is positioned around the housing to capture the individual lengths of pet food product and direct them downwardly to a conveyor for further processing in a manner disclosed in U.S. Pat. No. 4,900,572.

FIG. 2 discloses that housing 20 is generally formed by a cylindrical extrusion wall 140, and circular first and second end walls 150 and 160, respectively. The extrusion wall 140 and end walls 150,160 are bolted together and define an outer chamber 170. Outer chamber 170 is radially symmetrical about an axis which is coaxial with the longitudinal axes of inlet pipes 30 and 40.

End wall 150 includes an opening 151 at its center to permit interconnecting attachment of inlet pipe 30 to the chamber 170. End wall 160 has an opening 161 at its center to permit interconnecting attachment of inlet pipe 40 to chamber 170.

Extrusion wall 140 includes three openings 180 extending therethrough. The openings are symmetrically spaced about a circumference of extrusion wall 140 and the axis of chamber 170. As best disclosed in FIG. 3, the openings 180 are fitted with outer sleeves 181 and inner sleeves 182. An inner end 183,184, respectively, of sleeves 181,182 are each tapered to form a frustoconical inner orifice opening 185. Sleeves 181 and 182 are right-circular cylinders, thus defining the cylindrical extrusion orifice 80. It should be understood that, if other than a circular cylindrically-shaped continuous product is desired, the sleeves 181,182 can be replaced with sleeves which will define a different shape cylinder for the extruded continuous body. For example, sleeves may be provided to extrude a continuous body which, when cut to product length, resemble a cut of meat, such as a T-bone steak or the like.

Figure 3:
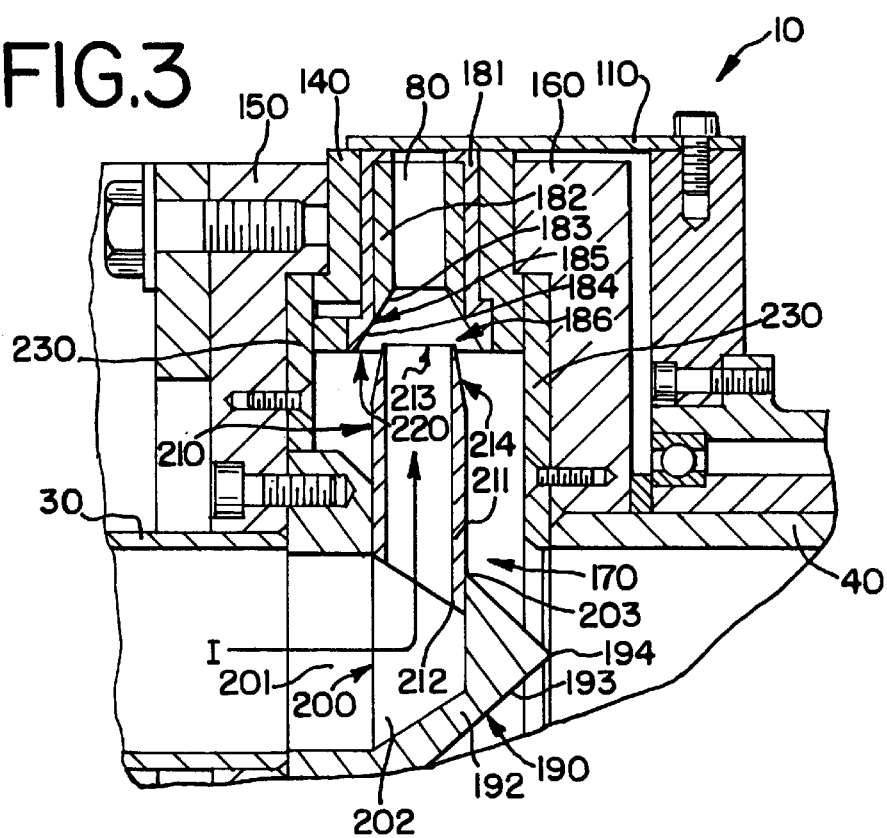
FIG. 3 is an expanded, partial cross sectional view of the manifold of FIG. 1; and, FIG. 4 is an expanded, partial cross sectional view of an alternate embodiment of a multiple-extrusion manifold in accordance with the present invention.

As disclosed in FIGS. 2 and 3, an inner housing 190 is located within outer chamber 170 and is secured in place by bolts 191. The inner housing 190 has a unitary housing wall 192 which presents a conical outer surface 193 with an apex 194 and defines an inner chamber 200. The inner housing 190 and the inner chamber 200 are radially symmetrical about an axis which is coaxial with the outer chamber 170 and the inlet pipes 30,40 axes. Inner chamber 200 includes a cylindrical portion 201 which provides an opening into the inner chamber 200 for interconnection with inlet pipe 30. The inner chamber 200 tapers from the cylindrical portion 201 to form a frustoconical portion 202. The inner housing wall 192 includes three openings 203, permitting interconnecting attachment of three extrusion tubes 210 therein. The openings 203, and thereby the extrusion tubes 210, are radially symmetrically spaced around a circumference of the inner housing 190 and permit access to the frustoconical portion 202 of inner chamber 200. The extrusion tubes 210 extend at right angles to and are radially symmetrical about the axis of the inner housing 190.

The extrusion tubes 210 each include a tube wall 211 having an inner chamber connecting end 212 and an open terminal end 213. The inner chamber connecting ends 212 are angled so as not to disturb extrudate flow in the frustoconical portion 202 of inner chamber 200. The terminal ends 213 of each tube are cooperatively aligned with an extrusion orifice 80 so that an inner substance may be extruded from the terminal end 213 into orifices 80.

The terminal end 213 of extrusion tubes 210 have an outer diameter less than the frustoconical inner orifice opening 185, such that an annulus 220 is formed, which permits the outer extrudate to flow circumferentially around the inner extrudate and then extrude together through each extrusion orifice 80. To assist flow through the annulus 220, the terminal end 213 of extrusion tubes 210 presents a tapered outer surface 214.

In practice, a first extrudable dough is flowed from a first extruder through inlet pipe 40 in the direction of arrow 0 (FIG. 2). The extrudable dough then flows into and symmetrically fills the outer chamber 170. The extrudable dough flows around the inner housing 190 and tubes 210. In the meantime, a second extrudable dough is flowed from a second extruder through inlet pipe 30 in the direction of arrow I. The second extrudable dough then flows into and fills the inner chamber 200. Flow of the second extrudable dough continues from the inner chamber 200 symmetrically through each of the extrusion tubes 210 and into the extrusion orifices 80.

The first extrudable dough is flowed simultaneously through the annuli 220 joining the two doughs. The joined extrudable doughs are then coextruded through the orifices 80 as a continuous center-filled body.

Blades 110 then cut the continuous body into desired product lengths, as described above.

It should be appreciated that significant aspects of the above-described structures are symmetrical so that the path through which the first and second extrudable doughs flow from the extruders to each of the orifices 80 is substantially symmetrical and equal. In practice, it is found that the manifold 10 produces continuous bodies at each orifice 80 which are uniform without the need of valves or other adjustments. This is not to say that the flow rates from the extruders are not varied to get the desired flow of either the first or the second extrudable dough. Rather, an object of the present invention is to provide equal distribution and flow rate of extrudable dough between each of the extrusion orifices 80 regardless of conditions, such as extruder flow rate.

With respect to symmetry, the inlet pipe 30, the inlet pipe 40, outer housing 170, and inner housing 190 are all coaxially aligned. Conical outer surface 193 of inner housing 190 has an apex 194 which is also coaxially aligned with the inlet pipe 40. The coaxial apex 194 and the conical surface 193 are believed to assist in the uniform distribution of the first extrudable dough throughout the inner chamber 170 and in turn to the extrusion orifices 80.

Liners 230, made of a non-stick material such as ULTEM 1000™, are optionally provided on one side of the manifold housing end walls 150 and 160 to line the outer chamber 170 to assist flow of the first extrudable dough.

Figure 4:
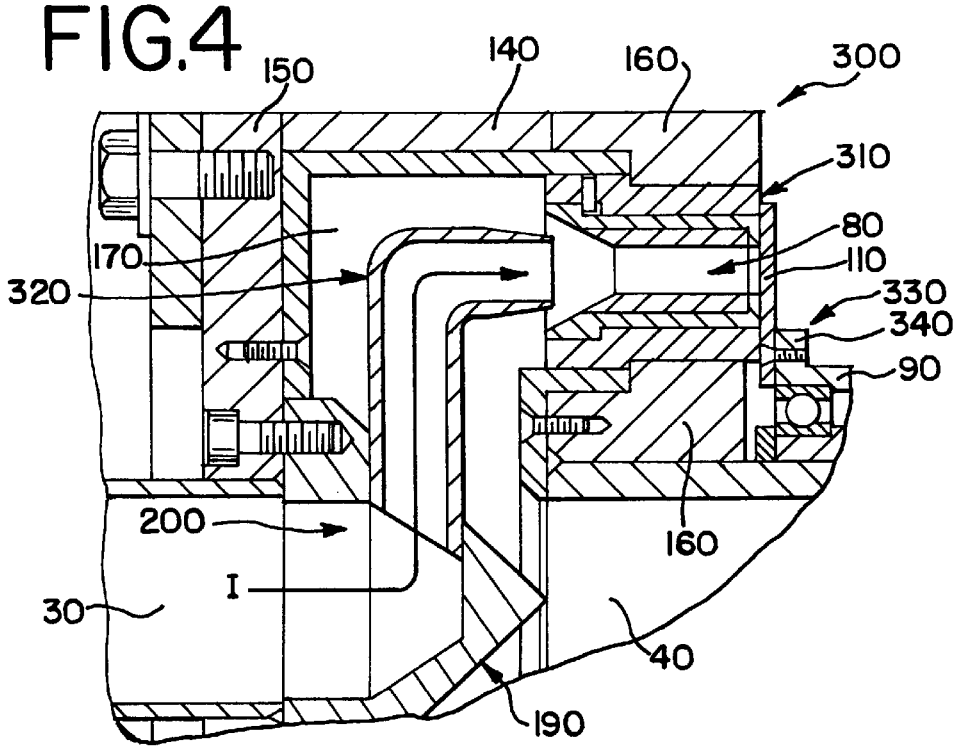

FIG. 4 discloses a multiple-orifice manifold 300 which is an alternate embodiment of the invention. The manifold 300 is a modification of manifold 10 and, as such, like reference numerals are used for like components. Manifold 300 differs from manifold 10 primarily in that the three extrusion orifices 80 extend through outer housing end wall 160, thus, presenting a planar outer extrusion surface 310 as opposed to the cylindrical outer extrusion surface 70 and extrusion wall 140 of manifold 10. Accordingly, three extrusion tubes 320 replace extrusion tubes 210 of manifold 10. The extrusion tubes 320 are provided with a right angle bend so as to cooperatively align with the extrusion orifices 80. As with the embodiment of manifold 10, the tubes 320 extend at right angles to the inner chamber 190 axis and are radially symmetrically spaced from each other. The extrusion orifices 80 are equally and symmetrically spaced in housing end wall 160. In particular the orifices 80 are radially symmetrical about the longitudinal axes of both inlet pipes 30, 40 and inner and outer housings 170,200.

Forming a new cutting assembly 330, a flange 340 with a diameter smaller than the flange 100 replaces the flange 100 on the hub 90 of the cutting assembly 50. The blades 110 are disposed on flange 340 coplanar with both the flange 340 and the extrusion surface 310. Thus, upon rotation the blades will cut the continuous body of center-filled dough into desired product lengths.

While the specific embodiments have been illustrated and described, numerous modifications come to mind without significantly departing from the spirit of the invention and the scope of protection is only limited by the scope of the accompanying claims.

For example, the multiple-orifice manifold 300 disclosed in FIG. 4 may be further modified to provide more orifices, such as orifices 80, and extend the orifices through end wall 150. Thus, the manifold 300 would have orifices 80 extending through first and second walls 140, 150. This, in turn would provide for two outer housing end walls having planar outer extrusion surfaces disposed directly opposite each other. In such a case, additional extrusion tubes, such as tubes 320 may be provided to co-align with the additional orifices, or the three tubes 320 may be modified to form a "Y" or "T" shape to symmetrically divide extrudate flow to all of the orifices 80.

Alternatively, a housing, such as the housing 20 shown in FIG. 3, may be shaped like a triangle, square or hexagon, etc. thereby defining multiple extrusion walls with flat outer surfaces through which the orifices 80 may extend.

For another example, the embodiment disclosed relates to a two-layer center-filled pet food. However, the principles of the invention may be applied to more than two-layer products. The principles of the invention also apply to other than food products or solid bodies. For example, the invention may be employed with any extrudable material, such as plastics, and may be used to make multi-layered hollow tubing or wire coating. Also, the extrusion surfaces do not have to be planar or circularly cylindrical, so long as the chosen shape permits symmetrical flow paths to the extrusion orifices. For example, an extrusion surface, such as 70, could have flat facets surrounding each of the three orifices or the surface could be triangular.

We claim:

1. A multiple-orifice extrusion manifold comprising:

a first housing defining an outer chamber which is substantially symmetrical with respect to a flow of an extrudable substance flowing through the chamber;

a plurality of orifices in the first housing adapted to extrude a first substance from the outer chamber; and, a plurality of tubes adapted to carry a second substance, the tubes extending through the outer chamber in generally symmetrical relationship with respect to each other, the outer chamber, and to a flow of an extrudable substance flowing through each tube, each tube having one end in communication with an extruder for a second substance and another terminal end cooperatively aligned with a respective one of the orifices to extrude the second substance within the first substance.

2. The multiple-orifice extrusion manifold of claim 1, further comprising:

an inlet into the outer chamber for admitting the first substance into the outer chamber, the outer chamber being sufficiently symmetrical about the inlet to provide substantially equal paths for the first substance from the inlet to the orifices.

3. A multiple-orifice extrusion apparatus comprising:

a plurality of means for combining a plurality of extrudable substances into an axially-layered product and for extruding the product as a continuous body;

a plurality of extruders for providing the plurality of extrudable substances;

a plurality of flow paths, one for each extrudable substance, the flow paths being between the extruders and the means for combining the extrudable substances, at least a portion of the flow path for each extrudable substance being sufficiently symmetrical relative to the other flow paths for that extrudable substance such that a flow of each extrudable substance is substantially equal to each of the combining means.

4. The extrusion apparatus of claim 3 wherein the plurality of means for combining a plurality of extrudable substances includes a plurality of cylindrical orifices.

5. The multiple-orifice extrusion manifold of claim 1, further comprising:

a second housing being disposed within the first housing and defining an inner chamber, the second housing being located within the outer chamber such that it permits substantially symmetrical flow of the first substance around the second housing; and, the plurality of tubes extending from the second housing so as to provide a flow path for the second substance from the inner chamber to the orifices.

6. The manifold of claim 1 wherein the first housing has an extrusion wall, the orifices extending through the extrusion wall, the extrusion wall presenting a substantially right circular cylindrical outer surface.

7. The manifold of claim 5 further including an extrusion wall, the orifices extending through the extrusion wall and the extrusion wall presenting a generally cylindrical outer surface.

8. The manifold of claim 1 wherein the first housing has an extrusion wall, the orifices extending through the extrusion wall, the extrusion wall presenting a generally planar surface.

9. The manifold of claim 5 wherein the first housing includes a first extrusion wall and a second extrusion wall, each extrusion wall having a plurality of orifices adapted for extruding the first substance from the outer chamber.

10. A multiple-orifice extrusion manifold comprising:

a plurality of extrusion orifices adapted to receive an outer layer substance and an inner layer substance;

a means for flowing the outer layer substance from a first extruder output to the extrusion orifices;

the means for flowing the outer layer substance providing an equal flow path from the first extruder output to each extrusion orifice;

a means for flowing the inner layer substance from a second extruder output to the extrusion orifices; and, the means for flowing the inner layer substance providing an equal flow path from the second extruder output to each extrusion orifice.

11. The multiple-orifice extrusion manifold of claim 5, wherein:

the second housing has an axis; and, the second housing has an axis; and, each of the tubes extends away from the inner chamber at an angle to the axis thereof.

12. The manifold of claim 11 wherein the angle is 90 degrees.

13. The manifold of claim 11 wherein the angle is 60 degrees.

14. The manifold of claim 11 wherein the outer chamber includes an inlet tube having a longitudinal axis and the inner chamber includes an inlet tube having a longitudinal axis, the longitudinal axes of the inlet tubes being coaxial with the inner chamber axis.

15. The manifold of claim 11 including an extrusion wall, the orifices extending therethrough and the extrusion wall presenting a substantially right circular cylindrical outer surface.

16. The manifold of claim 15 wherein the extrusion wall includes a flat facet area surrounding each orifice.

17. The manifold of claim 11 including an extrusion wall, the orifices extending through the extrusion wall, the extrusion wall presenting a generally planar outer surface.

18. The manifold of claim 11, including a first extrusion wall and a second extrusion wall, each extrusion wall having a plurality of the orifices extending therethrough.

19. A multiple-orifice extrusion manifold comprising:
   a stationary extrusion manifold housing including a cylindrical outer surface with a plurality of extrusion orifices therein, the orifices having means for extruding an inner substance and an outer substance as a continuous product body, the cylindrical outer surface having a longitudinal axis with which the cylindrical outer surface is concentric, wherein the manifold housing is mounted to a feed tube supplying extrudate.

20. The manifold of claim 19 wherein the extrusion orifices are equally spaced around the cylindrical outer surface and perpendicularly disposed relative to the longitudinal axis of the cylindrical outer surface.

21. The manifold of claim 19 further including a means for separating a continuous extrusion body emanating from the orifices into predetermined product lengths.

22. The manifold of claim 21 wherein the means for separating including a first blade having a rotating path about the cylindrical outer surface to cut the continuous extrusion at each orifice as it passes the orifice.

23. The manifold of claim 21 wherein the means for separating including a plurality of blades mounted proximate the manifold housing, the blades having a rotating path about the cylindrical outer surface to cut the continuous extrusion at each orifice as each blade passes the orifice.

24. The manifold of claim 10 wherein:
   the means for flowing the outer layer substance includes a housing with a chamber and an inlet into the chamber for admitting the outer layer substance into the chamber, the orifices are adapted to extrude the outer layer substance from the chamber, and the chamber is sufficiently symmetrical about the inlet to provide substantially equal paths for the outer layer substance from the inlet to each of the orifices.

25. The manifold of claim 24 wherein the chamber has an extrusion wall and the orifices extend therethrough, the extrusion wall presenting a substantially right circular cylindrical outer surface.

26. The manifold of claim 24 wherein the chamber has an extrusion wall and the orifices extend therethrough, the extrusion wall presenting a generally cylindrical outer surface and the extrusion wall including a flat facet area surrounding each orifice.

27. The manifold of claim 24 wherein the chamber has an extrusion wall and the orifices extend therethrough, the extrusion wall presenting a generally planar outer surface.

28. The manifold of claim 24 wherein the housing includes a first extrusion wall and a second extrusion wall, the first and second extrusion walls each having a plurality of orifices adapted for extruding the outer layer substance from the chamber.

29. The manifold of claim 10 wherein:
   the means for flowing the outer layer substance includes a housing with a chamber and an inlet into the chamber for admitting the outer layer substance into the chamber, the orifices being adapted to extrude the outer layer substance from the chamber and the chamber being sufficiently symmetrical about the inlet to provide substantially equal paths for the outer layer substance from the inlet to each of the orifices; and,
   the means for flowing the inner layer substance include a plurality of tubes adapted to carry the inner layer substance, each tube extending through the chamber and having a terminal end cooperatively aligned with a respective one of the orifices to extrude the inner layer substance within the outer layer substance.

30. The manifold of claim 10 wherein:
   the means for flowing said outer layer substance includes a first housing defining an outer chamber, the extrusion orifices being adapted to extrude the outer layer substance from the outer chamber and the outer chamber having an inlet for flowing the outer layer substance into the outer chamber;
   the means for flowing the inner layer substance includes a second housing within the first housing and defining an inner chamber, and a plurality of tubes extending from the second housing, each tube having a first open end opening into the inner chamber and a second open end cooperatively aligned with a respective one of the orifices for extruding the inner layer substance from the inner chamber though the tube and within the outer layer substance,
   the inlet being disposed so as to permit flow of the inner layer substance generally symmetrically within the outer chamber, and the second housing being disposed within the outer chamber to permit symmetrical flow of the inner layer substance around the second housing.

31. The manifold of claim 30, wherein the first housing presents a substantially right circular cylindrical outer surface.

32. The manifold of claim 30 wherein the first housing presents a generally cylindrical outer surface, said outer surface including a flat facet area surrounding each orifice.

33. The manifold of claim 30, wherein the first housing includes a first extrusion wall and a second extrusion wall, the first and second extrusion walls including said extrusion orifices.

34. The manifold of claim 10 wherein:
   the means for flowing the outer layer substance include a first housing defining an outer chamber, the orifices being adapted for extruding the outer layer substance from the outer chamber;
   the means for flowing the inner layer substance include a second housing within the first housing defining an inner chamber having an axis;
   a plurality of tubes are disposed on the second housing, each tube having a first open end opening into the inner chamber and a second open end cooperatively aligned with a respective one of said orifices for extruding the inner layer substance from the inner chamber, through the tube, and within the outer layer substance; and
   each of the tubes extend away from the inner chamber at an angle to the axis thereof.

35. The manifold of claim 34, wherein the angle is 90 degrees.

36. The manifold of claim 34, wherein the angle is 60 degrees.

37. A multiple-orifice multiple-layer extrusion apparatus comprising:
   means for combining a plurality of extrudable substances into an axially-layered product and for extruding the product as a continuous body;

a plurality of extruders for providing the extrudable substances;

a flow path for each extrudable substance, the flow paths being between the extruders and the means for combining the extrudable substances, the flow path for each extrudable substance being sufficiently equal relative to the other flow paths for the same extrudable substance to permit the flow of the extrudable substance to be substantially equal at each of the combining means.

38. The extrusion apparatus of claim 37, including means to divide the continuous product body into discrete lengths after the product is extruded.

* * * * *

UNITED STATES PATENT AND TRADEMARK OFFICE
CERTIFICATE OF CORRECTION

PATENT NO.   : 5,906,838
DATED        : May 25, 1999
INVENTOR(S)  : William T. Keehn, Theodore J. Molski, and Edwin L. Morphey It is certified that errors appear in the above-identified patent and that said Letters Patent is hereby corrected as shown below:

Column 8, Line 56, delete "the second housing has an axis; and,"

Signed and Sealed this

Twentieth Day of June, 2000

Attest:

Q. TODD DICKINSON

*Attesting Officer*   *Director of Patents and Trademarks*